United States Patent Office 3,475,502
Patented Oct. 28, 1969

3,475,502
NOVEL CHLOROCARBON
Raymond R. Hindersinn, Lewiston, N.Y., assignor to Hooker Chemical Corporation, Niagara Falls, N.Y., a corporation of New York
No Drawing. Filed Apr. 3, 1962, Ser. No. 184,671
Int. Cl. C07c 17/24; C08f 45/00
U.S. Cl. 260—648    3 Claims This invention relates to a new chemical compound composed of carbon and chlorine, having an empirical formula of $C_{10}Cl_8$. More particularly, this invention relates to a new cheimcal compound octachlorobicyclopentadienylidene having an empirical formula $C_{10}Cl_8$ and a decomposition temperature of about two hundred degrees centigrade.

The compound of this invention can be prepared by reacting bis-pentachlorocyclopentadienyl with a solvent at a temperature in the range from about twenty degrees centigrade to about sixty degrees centigrade and in the presence of anhydrous ferrous chloride.

The compound of this invention is presumably prepared by the following equation, although I do not wish to be limited by theory:

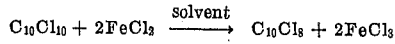

$$C_{10}Cl_{10} + 2FeCl_2 \xrightarrow{\text{solvent}} C_{10}Cl_8 + 2FeCl_3$$

The $FeCl_2$ can be supplied by reacting $FeCl_3$ with iron. The preferred solvents which may be employed are tetrahydrofuran, 3-ethoxy propane, and 1-methoxy butane, and other ethers. Aliphatic hydrocarbons such as hexane, heptane, etc., are also useful.

It is known that a chlorocarbon having the empirical formula $C_{10}Cl_8$ can be prepared by reacting hexachlorocyclopentadiene at a temperature between one hundred and eighty degrees centigrade and three hundred degrees centigrade, and in the absence of a catalyst, which compound is disclosed and claimed in United States Patent No. 2,801,269. The chlorocarbon produced, however, differs from the $C_{10}Cl_8$ of the instant invention as evidenced by the physical data reported, i.e., melting point of three hundred and forty-seven degrees centigrade for the chlorocarbon in U.S. Patent No. 2,801,269, as compared with a decomposition temperature of two hundred degres centigrade in the instant invention. Also, comparison of the ultraviolet absorption spectra further points out the difference between the two compounds, i.e., the $C_{10}Cl_8$ produced in U.S. Patent No. 2,801,269 has a maximum at 268 m$\mu$ and 278 m$\mu$ in cyclohexane, while the compound of the instant invention has a maximum m$\mu$ 387 and 603 in hexane. Furthermore, a different process is employed for the preparation of the chlorocarbon in United States Patent No. 2,801,269.

At the reaction temperature range specified, the yield of the desired product is significant as illustrated herein. The time allowed for reaction will vary with the purity of the reactants, the degree of completion of the desired reaction, the solvents employed, etc., but will generally not exceed about thirty hours. Refluxing for a period of from zero to four hours has given a satisfactory yield.

The reaction product is purified in order to obtain a crystalline residue free from impurities. Ordinary purification procedures such as recrystallization, washing, etc., may be employed.

The compound of this invention is useful as an intermediate for the preparation of insecticides, as a dyestuff, and as a U.V. absorber. Further, the compound of this invention is useful for preparing homopolymers and copolymers as illustrated herein. In addition, the compound of this invention is useful as a fire-retardant in polymers as more fully illustrated in the example given below.

Typical monomers for preparing copolymers with the compound of this invention are compounds containing the reactive group $H_2C\text{—}C\text{=}$. Specific examples include styrene, vinyl toluene, chlorostyrene, methylstyrene, methylacrylate, and the like.

Typical polymers in which the compound of this invention finds utility as an additive are homopolymers and copolymers of unsaturated aliphatic, alicyclic and aromatic hydrocarbons such as polyethylene, polypropylene, polybutene, ethylene/propylene copolymers; copolymers of ethylene or propylene with other olefins, polybutadiene; polymers of butadiene, polyisoprene both natural and synthetic, polystyrene, polyindene, indenecoumarone resins; polymers of acrylate esters and polymers of methacrylate esters. Acrylate and methacrylate resins such as ethyl, acrylate, n-butyl methacrylate, isobutyl methacrylate, ethyl methacrylate, and methyl methacrylate; alkyd resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins, furan resins (furfuryl alcohol or furfural-ketone); hydrocarbon resins from petroleum; isobutylene resins (polyisobutylene); isocyanate resins (polyurethanes); melamine resins such as melamine-formaldehyde and melamine-urea-formaldehyde; oleo-resins; phenolic resins such as phenolformaldehyde, phenolic-elastomer, phenolic-epoxy, phenolic-polyamide, and phenolic-vinyl acetals; polyamide resins such as polyamides and polyamide-epoxy; polyester resins such as polyesters (unsaturated) and polyester elastomer and resorcinal resins such a resorcinol - formaldehyde, resorcinol - furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber and, butyl rubber; neoprene rubber (polychloroprene); polysulfides (Thiokol); styrene resins (polystyrene); terpene resins; urea resins; vinyl resins such as vinyl acetal, vinyl acetate or vinyl alcohol-acetate vinyl acetate copolymer, vinyl alcohol, vinyl chloride, vinyl butyral, vinyl chloride-acetate copolymer, vinyl pyrrolidone and vinylidene chloride copolymer; polyformaldehyde; bitumens and asphalts.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually the additives are mixed with the polymer in the molten state at temperatures that can range from the melting point to the decomposition temperature of the polymer. Alternatively the additives and polymer are dry-blended in the finely divided state so that an intimate mixture is obtained upon subsequent molding or extrusion.

The chlorinated compound of the instant invention is desirably incorporated into polymeric materials in the range from about one to about fifty percent by weight of the polymer composition, preferable from about twenty to about thirty-five percent by weight.

The following examples illustrate methods for the preparation and utilization of the compound of this invention, however, they are not to be construed as limiting the invention.

Example 1

A one-liter, 3 necked flask equipped with a dropping funnel, a mechanical stirrer, a reflux condenser with drying tube, and a gas inlet tube was flame-dried and filled with dry nitrogen. Anhydrous ferric chloride (47.25 g.) was weighed into the flask and 500 cc. of distilled anhydrous tetrahydrofuran added rapidly in order to prevent excessive exotherm during the dissolution of the solid. Powdered iron metal (18.0 g.) was then added, and the mixture stirred at reflux under a slow stream of nitrogen for one and one-half hours. A solution of 118.8 g. of bis(pentachlorocyclopentadienyl) in 250 cc. of anhydrous tetrahydrofuran was added to the stirred mixture over a five-minute period, while still hot and the resulting dark purple reaction mixture allowed to stand at room temperature for sixteen hours.

The tetrahydrofuran was then removed by vacuum distillation and 500 cc. of a 1:1 mixture of concentrated hydrochloric acid and distilled water added to the dark, partially solified residue. After a few minutes of stirring, 250 cc. of benzene was added and stirring continued for fifteen to twenty minutes. The black insoluble solid was removed by suction filtration, the cake washed with 800 cc. of hot benzene, the organic layer separated from the filtrate, and extracted with dilute hydrochloric acid until the acid washes were almost colorless. The organic layer was then concentrated to dryness under vacuum to leave a violet crystalline residue. Recrystallization of the crystalline residue from 430 cc. of hexhane yielded 13.9 g. of $C_{10}Cl_8$ as violet rhombic crystals. A further recrystallization from hexane gave product with the following physical constants:

*Analysis.*—Calcd. for $C_{10}Cl_8$: C, 29.75; Cl, 70.25. 70.25. Found: C, 29.85; Cl, 69.10.

MW: 431 ebullioscopic in benzene. Theory—404. U.V. spectrum: max. 389 m$\mu$, log E 4.61; in hexane: max. 603 m$\mu$, log E 2.43; M.P.: decomposes at 200° C.; IR spectrum: 651$\mu$, 7.95$\mu$, 8.05$\mu$, 8.61$\mu$, 13.03$\mu$, 14.21$\mu$, 14.51$\mu$.

Example 2.—Use as a fire-retardant in polymers

One gram of styrene was mixed with 0.3 gram of $C_{10}Cl_8$ as prepared in Example 1, and 0.1 gram of benzoyl peroxide. This mixture was placed in a sealed test tube and heated at one hundred and ten degrees centigrade overnight, followed by a heating period of 6.5 hours at one hundred and fifty-five degrees centigrade. The clear, brown, viscous liquid which resulted was dissolved in benzene, and then, precipitated by pouring into 25 cc. of methanol. The yellow polymer that resulted was reprecipitated as above and dried. This polymer melted into a clear brown solid which was self-extinguishing on ignition.

Chlorine content.—Calcd. for the original mixture 15.7; found 14.18.

Example 3. Thermal polymerization of $C_{10}Cl_8$

To a weighed 100 cc. flask equipped with a stop-cock was added 0.508 g. of $C_{10}Cl_8$ and the system filled with dry nitrogen. The closed container was then heated at one hundred fifty to two hundred and fifty degrees centigrade in an air circulating oven for one hour. The resulting yellow solid was dissolved in 65.5 cc. of a 45:55 benzene-hexane mixture and the solution chromatographed on a column of 30.0 g. of Florisil (Floridin Co., Warren, Pa.) using 200 cc. of 55:45 hexane-benzene mixture, 160 cc. of 25:75 hexane-benzene mixture, 150 cc. of benzene, 200 cc. of 50:50 benzene-ether mixture, and 100 cc. of ether as an eluent. The initial 100 cc. of 55:45 hexane-benzene eluent was combined and evaporated to dryness to yield 0.30 g. of a yellow amorphous solid with an ebulliscopic molecular weight in benzene of 4700.

While there have been described various embodiments of the invention, the methods and products described are not intended to be understood as limiting the scope of the invention, as it is realized that changes therein are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

I claim:

1. The process for preparing a chlorocarbon having an empirical formula $C_{10}Cl_8$ and a decomposition temperature of about two hundred degrees centigrade, which comprises heating bis(pentachlorocyclopentadienyl) in the presence of a solvent and a material selected from the group consisting of: (1) ferric chloride and iron, (2) ferrous chloride, and (3) mixtures thereof at a temperature in the range between about twenty and about sixty degrees centigrade, and recovering said chlorocarbon as a product of the process.

2. The process of claim 1 wherein the material is ferric chloride and iron.

3. The process of claim 2 wherein the solvent is tetrahydrofuran.

References Cited

UNITED STATES PATENTS 3,328,472  6/1967  Mark _____ 260—648

LEON ZITVER, Primary Examiner

MATTHEW M. JACOB, Assistant Examiner

U.S. Cl. X.R.

106—15, 16, 190; 260—23.3, 13, 28, 3.3, 45.7, 109, 814, 87.5, 86.3